(12) United States Patent
Mochizuki et al.

(10) Patent No.: US 7,654,714 B2
(45) Date of Patent: Feb. 2, 2010

(54) VEHICULAR LAMP

(75) Inventors: Kazuhisa Mochizuki, Shizuoka (JP); Masafumi Ohishi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 193 days.

(21) Appl. No.: 11/888,517

(22) Filed: Aug. 1, 2007

(65) Prior Publication Data
US 2008/0062709 A1    Mar. 13, 2008

(30) Foreign Application Priority Data
Sep. 13, 2006   (JP)   ............................. 2006-247589

(51) Int. Cl.
B60Q 1/04    (2006.01)
F21V 11/00   (2006.01)

(52) U.S. Cl. .................. 362/539; 362/545; 362/518

(58) Field of Classification Search ................ 362/518, 362/539, 538, 545, 547, 346
See application file for complete search history.

(56) References Cited
U.S. PATENT DOCUMENTS

| | | | |
|---|---|---|---|
| 7,387,416 B2* | 6/2008 | Tsukamoto et al. | ......... 362/518 |
| 7,419,290 B2* | 9/2008 | Inaba | ......................... 362/538 |
| 2003/0072167 A1* | 4/2003 | Albou | ........................ 362/543 |
| 2004/0208019 A1* | 10/2004 | Koizumi et al. | ............. 362/545 |
| 2006/0104077 A1 | 5/2006 | Oshio et al. | |
| 2007/0091632 A1* | 4/2007 | Glovatsky et al. | ........... 362/547 |

FOREIGN PATENT DOCUMENTS

JP    64-067804    3/1989

* cited by examiner

Primary Examiner—Stephen F Husar
Assistant Examiner—Peggy A. Neils
(74) Attorney, Agent, or Firm—William L. Androlia; H. Henry Koda

(57) ABSTRACT

A vehicular lamp with a light source unit that includes a main reflector for reflecting light irradiated from a first light source, a projection lens that condenses and radiates light reflected by the main reflector, and a shade that blocks a part of the light reflected by the main reflector, wherein the light source unit further includes a second light source, which is disposed on the opposite side from the projection lens provided on the shade, and the shade is formed with a light transmission portion which is an opening that allows the light irradiated from the second light source to pass therethrough to the projection lens.

8 Claims, 5 Drawing Sheets

VEHICULAR LAMP

BACKGROUND OF THE INVENTION

1. Field of the Invention

The present invention relates to a vehicular lamp having a projection lens that condenses light irradiated from the light source and more particularly to a vehicular lamp further provided with a second light source.

2. Description of the Related Art

Lamps known as projector-type lamps have recently been used as front lamps (headlamps) and auxiliary lamps (fog lamps) for automobiles. Such projector-type lamps generally include a projection lens that is formed by a condenser lens and is provided in front of the light source; and in such projector-type lamps, light irradiated from the light source is reflected by a reflector and condensed at a rear-side focal point of the projection lens or a nearby position thereof, so that the condensed light is projected by the projection lens. This type of projector-type lamps provide a wide illumination range while enabling downsizing of the light irradiation surface on the front surface of the lamp, and thus they are advantageous in terms of achieving lamps of a smaller size.

In addition, some projector-type lamps use a semiconductor light-emitting element, such as a light-emitting diode (LED), as the light source; and such projector-type lamps that use LEDs have been proposed greatly in recent years since such lamps further contribute downsizing of the reflector and projection lens as disclosed in, for example, United States Patent Application Publication No. 2006/0104077.

In such a projector-type lamp as described above, in order to obtain a targeted light distribution pattern (illumination pattern), a shade for blocking light is internally disposed so that it is located between the reflector and the projection lens. A part of light flux reflected by the reflector and incident to the projection lens is, as a result, blocked so that the light flux irradiated from the projection lens is limited.

The lamp disclosed in, for example, Japanese Patent Application Laid-Open (Kokai) No. 01-67804 is provided with a shade which is formed such that an upper edge portion thereof follows horizontal and oblique cut-off lines in order to provide a low-beam light distribution pattern for an automobile. Furthermore, the lamp proposed in the above-described publication has a configuration that a second light source is provided inside the lamp body, so that the second light source can be selectively lit in order to increase the variety of obtainable light distribution patterns and achieve light illumination that adapts to various running conditions of the automobile.

The lamp of the above-described publication uses incandescent bulbs for its light source (which is a first light source) and second light source. However, two incandescent bulbs inside the lamp results in an extremely large amount of heat when both incandescent bulbs are lit at the same time, thus resulting in an issue of heat release. Particularly problematic matters are significant temperature increases in the shade provided to face the first light source and of the projection lens provided to face the second light source. As a result, use of a semiconductor light-emitting element such as an LED for the second light source is a conceivable solution. For example, by using an LED as the second light source, at least the temperature increase in the opposing projection lens can be suppressed.

However, in the lamp of the above-described publication (Japanese Patent Application Laid-Open (Kokai) No. 01-67804), since the second light source is provided between the projection lens and the front side of the shade, the second light source is exposed through the projection lens and consequently worsens the overall outer appearance of the lamp. Also, since no shade to control the light flux with respect to the second light source is provided, it is difficult to secure a space for providing a shade. This in turn makes it difficult to provide a desired light distribution pattern when the second light source is lit.

BRIEF SUMMARY OF THE INVENTION

It is, therefore, an object of the present invention to provide a vehicular lamp that is capable of providing a desired light distribution pattern when a second light source thereof is lit, while also improving the overall outer appearance of the lamp without exposing the second light source.

It is another object of the present invention to provide a vehicular lamp that is capable of suppressing a temperature increase of the lamp.

The above objects are accomplished by a unique structure of the present invention for a vehicular lamp that includes a light source unit comprising a first light source, a main reflector for reflecting light from the first light source, a projection lens for condensing and radiating light reflected by the main reflector, and a shade for blocking a part of light reflected by the main reflector; and in this light source unit, the light source unit further comprises a second light source, which is provided on an opposite side of the shade from the projection lens, and a light transmission portion (which is a through hole), which is formed in the shade so that light irradiated from the second light source pass therethrough to the projection lens.

As seen from the above, according to the present invention, the second light source is provided on the rear side of the shade, which is an opposite side from the projection lens, and the light transmission portion (a through hole) is formed in the shade so that light from the second light source passes therethrough to the projection light. Accordingly, light flux from the light transmission portion can be controlled so that the lamp is able to provide a desired light distribution pattern. Furthermore, since the rear side of the shade is dark as it is difficult for external light to reach, the second light source is not exposed through the projection lens or the light transmission portion and thus not seen from the outside of the lamp (through the projection lamp). Accordingly, the lamp has an improved overall outer appearance.

In the present invention, the second light source is formed by a semiconductor light-emitting element. Accordingly, heat generated by the second light source can be suppressed, and a temperature increase of the lamp is prevented accordingly. Since the first light source is also formed by a semiconductor light-emitting element, heat generated by the first light source is suppressed as well, and a temperature increase of the lamp is further prevented accordingly.

In the present invention, the light source unit comprises the first light source and the second light source, and these light sources are provided on a heat block for releasing the heat generated by the respective light sources. Accordingly, heat generated by the first and second light sources can be easily and effectively released, and as a result, the temperature increase of the lamp is sufficiently prevented.

DETAILED DESCRIPTION OF THE INVENTION

Embodiments of the present invention will be described below in detail with reference to the accompanying drawings.

Figure 1:
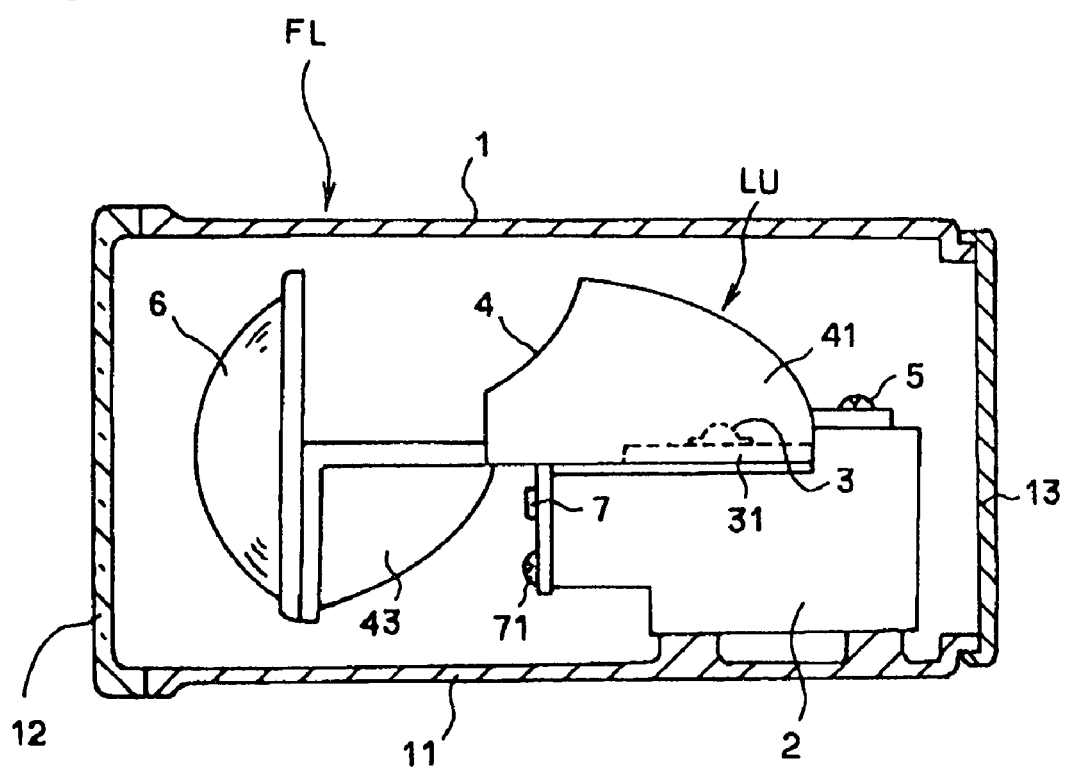
FIG. 1 is a cross-sectional view of a fog lamp according to a first embodiment of the present invention.

FIG. 1 is a cross-sectional view of the first embodiment in which the present invention is applied to a fog lamp of an automobile.

The fog lamp FL is used in combination as a daytime running lamp for increasing the visibility of the host vehicle, i.e., increasing the visibility performance of the vehicle that is mounted with the fog lamp FL, so as to be easily recognized by other vehicles in the daytime. The fog lamp FL has a configuration in which the lamp housing 1 is formed by a lamp body 11, a transparent cover 12 that is attached to the front opening of the lamp body 11, and a back cover 13 that covers the back opening of the lamp body 11; and mounted inside the lamp housing 1 is a single light source unit LU that includes a semiconductor light-emitting element. In the shown embodiment, the semiconductor light-emitting element is a light-emitting diode (LED).

Figure 2:
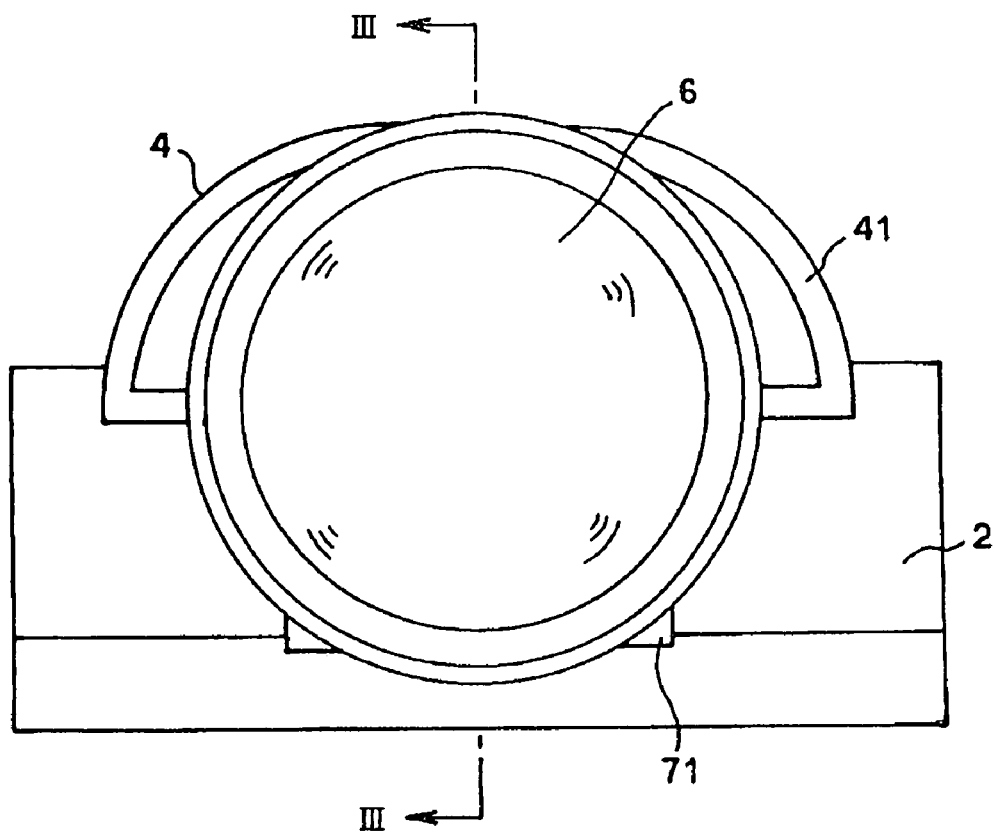
FIG. 2 is a frontal view of the light source unit of the fog lamp according to the first embodiment.
Figure 3:
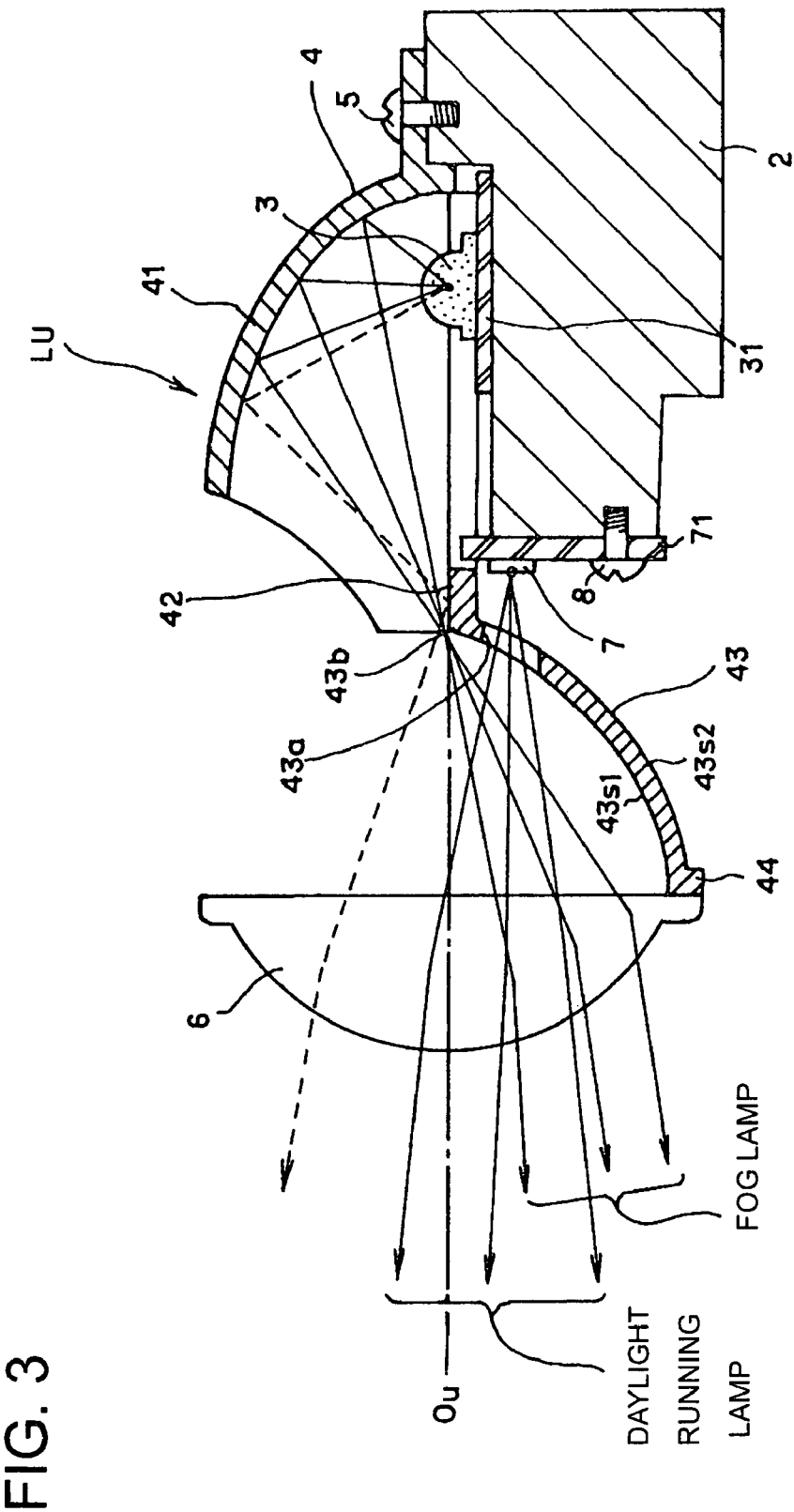
FIG. 3 is a cross-sectional view taken along the line III-III in FIG. 2.
Figure 4:
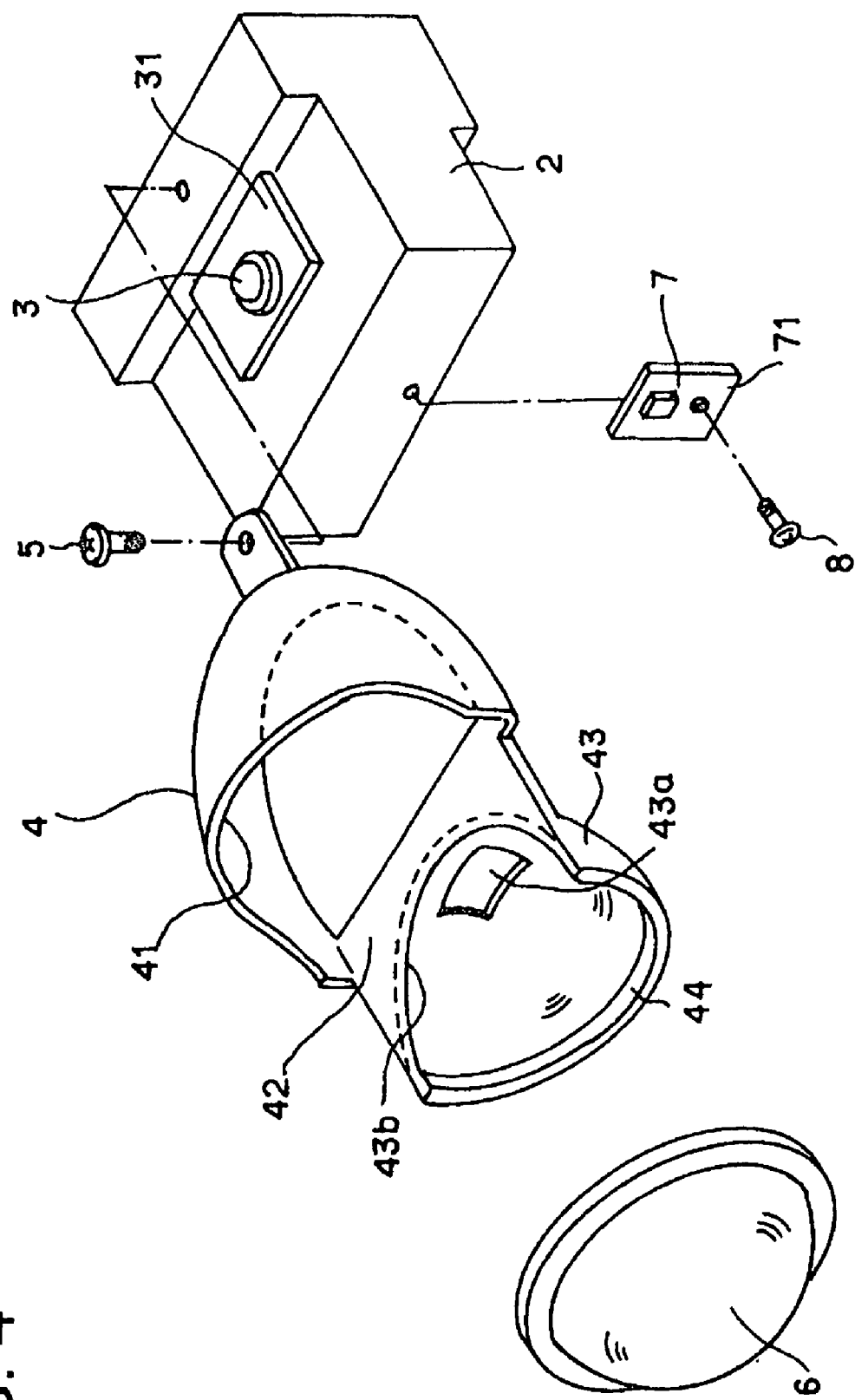
FIG. 4 is a partially exploded perspective view of the light source unit according to the first embodiment.

More specifically, as shown respectively in a frontal view in FIG. 2, a vertical cross-sectional view along the line III-III in FIG. 3, and a partial exploded perspective view in FIG. 4, the light source unit LU is comprised of an optical block 4 and a heat block 2. A main circuit board 31 is loaded in a horizontal state on the upper surface of the heat block 2, which is formed from a metal or the like with high thermal conductivity, and this circuit board 31 is mounted with a first LED 3 that acts as the first light source of the fog lamp FL. The first LED 3 is a hemispheric discreet LED; and the light-emitting point of the first LED 3 is set on a unit optical axis (or on the optical axis of the light source unit) Ou, and the emission optical axis of the first LED 3 is oriented in perpendicularly upward.

The optical block 4 is formed by integration of a main reflector 41, a sub-reflector 42, and a shade 43; and this optical block 4 is fixed to the heat block 2 by a screw 5. The main reflector 41 is generally formed as a rotational semi-ellipsoid shape so as to cover the head block 2 from above. The sub-reflector 42 is a plane element that connects the main reflector 41 to the shade 43 and whose upper surface extends generally horizontal along the unit optical axis Ou in the front region of the heat block 2. The front edge portion of the sub-reflector 42 takes a concaved arc shape within the horizontal plane. The shade 43 is formed as a concave portion in which an area from the arc-shaped front edge portion of the sub-reflector 42 forward is hollowed out downward. Here, the boundary edge between the sub-reflector 42 and the shade 43 forms a shade edge portion 43b that determines an actual shaded region of the shade 43. Also, the shade 43 is provided with an opening 43a that functions as a light transmission portion for allowing light to pass therethrough. The opening 43a or the light transmission portion is formed in a part of the concave portion or in the curved rear wall of the shade 43.

In the optical block 4, the main reflector 41, the sub-reflector 42, and the shade 43 are integrally formed by resin molding, and the surfaces thereof are aluminized so as to become mirror surfaces that can reflect light. The inner (or front) surface 43s1 of the shade 43 is formed as a mirror surface; however, the rear surface 43s2 of the shade 43 does not necessarily need to be formed as a mirror surface.

The light-emitting point of the first LED 3 is positioned in the vicinity of a first focal point of the rotational ellipsoid of the main reflector 41. Likewise, the shade edge portion 43b of the shade 43 is positioned in the vicinity of a second focal point of the rotational ellipsoid of the main reflector 41.

A projection lens 6 formed by a single-convex lens is mounted, at its lower-side peripheral portion, on the semi-circular front edge 44 of the optical block 4 (or on the front edge of the shade 43). The optical axis of the projection lens 6 coincides with the unit optical axis Ou, and the rear-side focal point of the projection lens 6 is positionally set to be located in the vicinity of the second focal point of the main reflector 41, i.e., in the vicinity of the shade edge portion 43b.

A secondary circuit board 71 is fixed to the front surface of the heat block 2 by a screw 8. The secondary circuit board 71 is oriented perpendicular on the rear surface 43s2 side of the shade 43, i.e., on the side opposite from the projection lens 6. The secondary circuit board 71 is mounted with a second LED 7 that acts as the second light Source of the fog lamp FL. Thus, the second light source or the second led 7 is provided behind the shade 43 or on the opposite side of the shade 43 from the projection lens 6. The second LED 7 is a chip-type LED, and the light-emitting point of the second LED 7 is set to a position which is on the lower side of the unit optical axis Ou and is as close as possible to the shade edge portion 43b. The light-emitting point of the second LED is further set to a position that faces the shade opening (or the light transmission portion) 43a of the shade 43. In addition, the light emission optical axis of the second LED 7 is oriented towards the projection lens 6 horizontally, that is, oriented generally parallel to the unit optical axis Ou.

In the light source unit LU as described above, as shown by arrows (that represent optical paths) in FIG. 3, light emitted from the first LED 3 is reflected by the inner surface of the main reflector 41 and substantially condensed at the second focal point, and after which the light is irradiated forward while being condensed by the projection lens 6. When the light is thus irradiated, since the emission optical axis of the first LED 3 is oriented perpendicularly upward, a major part of the irradiated light is reflected by the main reflector 41 and passes through the second focal point. Therefore, light oriented along the direction of the unit optical axis Ou and downward from the unit optical axis Ou is incident to the projection lens 6 and irradiated forward. Also, a part of the light reflected by the main reflector 41 advances toward a lower region of the projection lens 6 and is blocked by the shade edge portion 43b. Accordingly, by suitably setting the shape of the shade edge portion 43b, it is possible to provide a predetermined light distribution pattern that is required by fog lamps. A part of the light reflected by the main reflector 41 is then reflected by the sub-reflector 42, as shown by a broken line in FIG. 3, after which such light is condensed at the projection lens 6 and irradiated forward. Accordingly, by way of superimposing such light on the light that forms the light distribution pattern, the irradiation efficiency of the light emitted from the first LED 3 can be improved.

Since the first LED 3 is mounted on the main circuit board 31, and the main circuit board 31 is fixed to the upper surface of the heat block 2, heat generated by the light emitted from the first LED 3 is transferred to the heat block 2 and released from the heat block 2. Consequently, a high cooling effect is obtained.

Meanwhile, when the fog lamp of the first embodiment is used as a daytime running lamp in order to increase the visibility of the host vehicle during the daytime, only the second LED 7 is lit to emit light. When the second LED 7 is lit, light irradiated from the second LED 7 passes through the shade opening (or the light transmission portion) 43a of the shade 43 located in front of the second LED 7, and as a result, light flux that is slightly narrowed and oriented slightly upward of the unit optical axis Ou is irradiated forward from the projection lens 6. Light irradiated through the shade opening 43a can thus be controlled by designing the shape and size of the shade opening 43a in a desired manner, as a result, a desired light distribution pattern is obtained.

The fog lamp of the shown embodiment of the present invention, as seen from the above, is thus able to function as a daytime running lamp that has an increased host vehicle's visibility with respect to other vehicles during the daytime.

In the fog lamp FL as described above, the second LED 7 is disposed on the rear side of the shade 43, and the rear side of the shade 43 is dark since it is difficult for external light to reach. Therefore, the rear side of the shade opening 43a is not easily visible through the front cover 12 of the fog lamp FL, and the second LED 7 is thus almost never exposed externally. Thus, since the second LED 7 is not seen from the outside through the front cover 12, it is possible to prevent the overall outer appearance of the fog lamp FL from being deteriorated. By designing the shape and size of the shade opening 43a of the shade 43 in a desired manner, light irradiated from the second LED 7 provides a desired light distribution pattern, since the light flux is controllable by the shade opening 43a. Furthermore, since the second LED 7 is mounted on the secondary circuit board 71, and the secondary circuit board 71 is fixed to the front surface of the heat block 2, heat generated by the light emitted from the second LED 7 is transferred to the heat block 2 and released from the heat block 2. Consequently, high cooling effect for the second LED 7 is assured.

Figure 5:
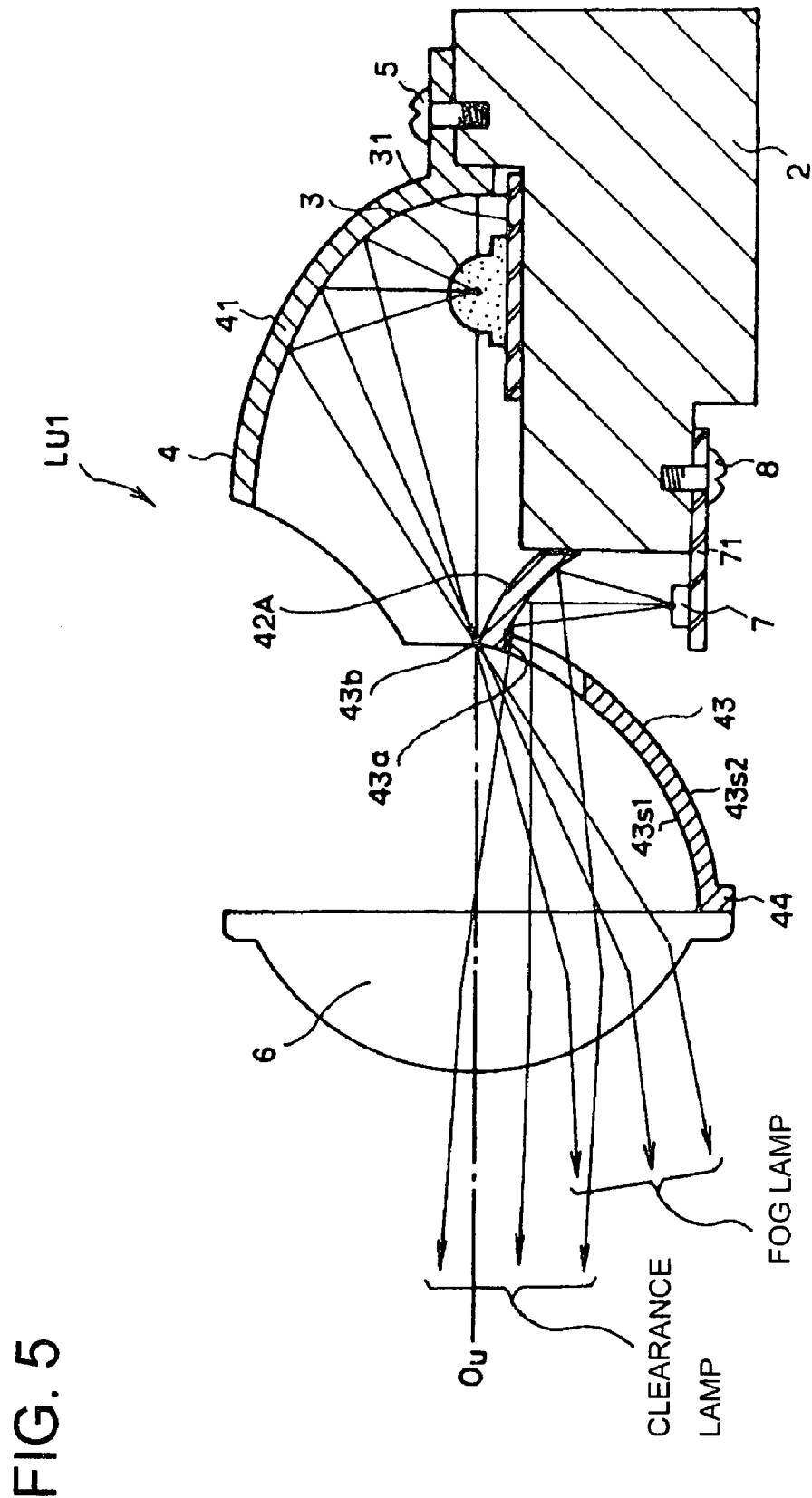
FIG. 5 is a cross-sectional view, similar to FIG. 3, of the light source unit according to a second embodiment of the present invention.

FIG. 5 shows, in a cross-sectional view, the light source unit according to the second embodiment of the present invention in which the present invention is applied to a fog lamp used in combination as a clearance lamp. For the fog lamp of the second embodiment, the same reference numerals are used for the portions corresponding to the like portions in the fog lamp FL of the first embodiment shown in FIG. 1.

Similar to the first embodiment, the fog lamp of the second embodiment has a configuration in which the lamp housing 1 is formed by the lamp body 11, the front cover 12, and the back cover 13, with a light source unit LU1 accommodated inside the lamp housing 1 (see FIG. 1 for these elements). For the light source unit LU1, the main circuit board 31 is provided in a horizontal state on the upper surface of the heat block 2, and the main circuit board 31 is mounted with the first LED 3.

In addition, the optical block 4, which is integrally formed by the main reflector 41, a sub-reflector 42A, and the shade 43, is fixed to the heat block 2 by screw 5. Here, the configuration of the main reflector 41 and the shade 43 is substantially the same as that in the first embodiment; however, the sub-reflector 42A partially differs from the sub-reflector 42 of the first embodiment. In the second embodiment, the sub-reflector 42A is curved, which in fact is nearly flat and has a concave shape in the downward direction on the rear side of the opening 43a of the shade 43. Moreover, the lower (under) surface of the sub-reflector 42A of such a concave shape is formed as a mirror surface.

The secondary circuit board 71 is fixed to the front surface of the heat block 2 by a screw 8 and oriented perpendicular to the rear surface of the shade 43. The secondary circuit board 71 has the second LED 7 thereon that acts as the second light source. The second LED 7 is a chip-type LED, and the light-emitting point thereof is disposed perpendicularly below the sub-reflector 42A. In addition, the emission optical axis of the second LED 7 is oriented perpendicularly upward.

In this fog lamp of the second embodiment, light irradiated when the first LED 3 emits light is reflected by the main reflector 41, and it passes through and irradiates from the projection lens 6, similar to the first embodiment. However, in the second embodiment, since the sub-reflector 42A is not flat as in the first embodiment, light reflected by the upper surface of this curved sub-reflector 42A is irradiated through the projection lens 6 without being superimposed on the light reflected by the main reflector 41. Accordingly, in the second embodiment, the upper surface of the sub-reflector 42A is used so that the (front) part of the upper surface forms the shade edge portion 43b, i.e., a boundary portion with respect to the shade 43.

Meanwhile, when the fog lamp of the second embodiment is used as a clearance lamp, only the second LED 7 is lit to emit light. Light irradiated from the second LED 7 is reflected by the concaved surface on the lower side of the sub-reflector 42A so as to be oriented slightly upward of the general horizontal direction and passes through the shade opening 43a to advance forward; and such light is slightly condensed by the projection lens 6 and irradiated forward from the projection lens 6 while being oriented slightly upward of the unit optical axis Ou. Light flux irradiated through the shade opening 43a can be controlled by (the size and shape of) the shade opening 43a, and thus it is possible for the fog lamp to provide a desired light distribution pattern.

Thus, the fog lamp of the second embodiment functions as a clearance lamp that provides a desired light distribution pattern, and this can be achieved by suitably designing the (size and shape of) shade opening 43a of the shade 43.

In the fog lamp of the second embodiment as well, the second LED 7 is disposed on the rear side of the shade 43. Accordingly, the second LED 7 is not seen from the outside the lamp, making it possible to prevent the overall outer appearance of the fog lamp from being deteriorated. By designing the shape and size of the shade opening 43a in a desired manner, light irradiated from the second LED 7 can provide a desired light distribution pattern, since the light flux is controlled by the shade opening 43a. Furthermore, since the second LED 7 is mounted on the secondary circuit board 71, and the secondary circuit board 71 is fixed to the front surface of the heat block 2, heat generated by the light emitted from the second LED 7 is transferred to the heat block 2 and released from the heat block 2.

The present invention is not particularly limited to the fog lamps described in the first and second embodiments. Furthermore, the lamp using the second light source is not particularly limited to the daylight running lamp of the first embodiment or to the clearance lamp of the second embodiment. In other words, the second light source can be formed as a night vision device that emits infrared light or as a light source that emits invisible light for a communications device or the like.

The first light source and the second light Source of the present invention are not necessarily semiconductor light-emitting elements. In other words, for a vehicular lamp that requires a high light intensity such as fog lamps, the first light source can be formed by an incandescent bulb or a discharge bulb.

In the present invention, any structure can be used for the light transmission portion (or shade opening) which is provided in the shade as long as the light irradiated from the second light source advances toward and then passes through the projection lens. The light transmission portion is thus not particularly limited to an opening (a through hole) provided in the shade as described in the first and second embodiments. For example, a transparent glass can be fitted in an opening provided in the shade.

The invention claimed is:

1. A vehicular lamp comprising a light source unit that includes:
   a first light source,
   a main reflector for reflecting light irradiated from the first light source,
   a projection lens for condensing and radiating light reflected by the main reflector, and
   a shade for blocking a pert of light reflected by the main reflector,
   wherein the light source unit further includes
   a second light source provided on an opposite side of the shade from the projection lens; and
   a light transmission portion formed in the shade for allowing light irradiated from the second light source to pass tberethrough to the projection lens; and wherein
   the light from the first light source and the light from the second light source pass through a common area of the projection lens, which includes a vicinity of a unit optical axis (Ou).

2. The vehicular lamp according to claim 1, wherein the second light source is formed by a semiconductor light-emitting element.

3. The vehicular lamp according to claim 1, wherein the first light source is formed by a semiconductor light-emitting element.

4. The vehicular lamp according to claim 1, wherein the light source unit further includes a heat block for releasing heat generated by the respective first and second light sources.

5. The vehicular lamp according to claim 1, further comprising a sub-reflector provided on the shade so as to reflect light emitted by the second light source and allow the reflected light to pass through the light transmission portion.

6. The vehicular lamp according to claim 5, wherein the shade, main reflector and sub-reflector are integrally formed by resin molding and the surfaces thereof are illuminized so as to become mirror surfaces that can reflect light.

7. The vehicular lamp according to claim 1, wherein said first light source comprises a fog lamp and said second light source comprises a daylight running lamp.

8. The vehicular lamp according to claim 4, wherein both said first and second light sources are provided on a single heat block.

* * * * *